Patented Aug. 10, 1954

2,686,183

UNITED STATES PATENT OFFICE 2,686,183

PLASTICIZATION OF ISOBUTYLENE-DIOLE-FIN-DIVINYL AROMATIC HYDROCARBON INTERPOLYMERS

Lester Marshall Welch, Madison, N. J., assignor to Standard Oil Development Company, a corporation of Delaware No Drawing. Application October 18, 1951,
Serial No. 252,005

11 Claims. (Cl. 260—30.8)

This invention relates to the processing of rubbery polymers; relates particularly to plasticization method for improving processing characteristics and cold flow properties of uncured polymers; and relates especially to processing methods for polymers containing minor amounts of a modifying agent such as divinyl benzene.

It has been known to prepare an extremely valuable copolymer of a major proportion of an isoolefin, such as isobutylene, with a minor proportion of a diolefin such as isoprene or butadiene by a low temperature reaction catalyzed by aluminum chloride in solution; the resulting polymer having a Staudinger molecular weight number within the range between about 25,000 and about 80,000 and an iodine number within the range between about 1 and 10 up to 50, which is reactive with sulfur, especially in the presence of a sulfurization aid, to yield a rubbery material which has many of the physical properties of natural rubber.

This material is particularly suitable for automobile inner tubes because of its high resistance to the diffusion of air or other gases under pressure. However, in the making of inner tubes from this polymer, difficulty has been encountered in the successive processing steps. The polymer extrudes reasonably well and shows a moderate swell at the extruder die, but, after extrusion, the inherently high plasticity or "cold flow" of the material causes it to lose its shape, if it is allowed to stand for several hours at room temperature before curing. In consequence, the successive forming steps must be carried through rapidly without pause until the material is cured. This requirement is awkward in plant practice; and, in spite of the utmost care, a considerable percentage of rejects is encountered through thin spots, failure to make the necessary butt splice, and other similar difficulties.

Accordingly, it was further found that, if the polymerization is conducted in the presence of traces or very small amounts of divinyl benzene or an analogous divinyl aromatic compound, such as alkyl substituted divinyl benzene, a good extrusion rate is maintained, the "swell" from the extrusion die is increased somewhat, and the tendency towards cold flow upon standing of the formed material is either completely removed or very greatly reduced. Furthermore, this effect can be carried over into blends of a polymer containing traces of divinyl benzene with the ordinary one lacking the divinyl benzene, to reduce the tendency towards cold flow to a value low enough to permit of reasonable time variations in the processing of the extruded polymer.

However, these improved polymers, which have been modified with small amounts of divinyl aromatic compounds, particularly divinyl benzene, suffer from a disadvantage which affects the processing itself. In order to get a polymer product which shows little or no cold flow and at the same time, shows reduced processing difficulties, it is necessary to exercise a good control over the Mooney value of the polymer, to keep it low in order to avoid a tough, unprocessable polymer.

It has now been found that it is possible to reduce the Mooney value of the divinyl benzene modified polymers, thereby improving their processing characteristics, and at the same time, preserve the cross-linked and/or branched structure of the polymers and obtain polymers showing greatly reduced cold flow. This has been accomplished by employing particular chemical plasticizer agents. The compounds employed as plasticizers are aryl mercaptans. In the practice of the invention, the modified high molecular weight olefinic copolymers are plasticized by the addition of aryl mercaptans to permit them to be processed as readily as polymers of lower molecular weights and, at the same time, retaining, to a great extent, the reduced cold flow, the high tensile strength, and other valuable properties, characteristic of both uncured and cured products of higher molecular weights.

In practicing the present invention there is prepared a mixture of isobutylene in major proportion and a diolefin containing at least two double linkages and from 4 to 14 carbon atoms per molecule, in minor proportion, such substances as butadiene, isoprene, piperylene, dimethyl-butadiene, and myrcene being particularly useful, adding to the mixture from 0.1% to about 5% of divinyl benzene or equivalents such as divinyl aromatics and alkyl substituted homologues, then, polymerizing the mixture at a temperature within the range between about −40° C. and −164° C. by the application to the cold mixture of a Friedel-Crafts catalyst in solution in a low-freezing, non-complex-forming solvent such as aluminum chloride in solution in methyl chloride, to produce the desired polymer.

The polymer is then removed from the polymerization reactor, brought up to room temperature and washed to remove residual catalyst and to drive out dissolved or adsorbed monomers from the original mixture. The polymer is then compounded with appropriate amounts of zinc oxide, carbon black, and a curing agent which may be sulfur and a sulfurization aid, or may be para quinone dioxime or may be dinitroso benzene or their analogs, homologs and equivalents. The resulting polymer compound is then extruded into the desired tubular shape, carried through the subsequent forming, splicing and valve pad applying operations, and is then cured under pressure in an appropriate mold to yield the desired article such as an inner tube; under conditions such that storage of the uncured tube in normal tube factory operation does not result in a final defective article because of excessive "bruising" or the development of thin spots or other inspection defects.

In preparing the polymer base stock, the first raw material is isobutylene, preferably of a purity of from 96 to 99.5%. The second raw material is an olefin containing at least two carbon to carbon double linkages. The preferred substance is isoprene but other multi-olefins having from 4 to 14 inclusive carbon atoms per molecule are usable; including such substances as butadiene, or piperylene, or dimethyl butadiene, or myrcene, or alloocymene, or 2-methyl 3-butyl butadiene-1,3 or 2-methyl 4-nonyl butadiene-1,3, the diolefinic ethers of a butadiene type substance with an aliphatic, and the like. The compounds may be described broadly as linear chain multiolefins, since each contains more than a single ethylenic or olefinic carbon to carbon double linkage. The isobutylene and the linear multi-olefin, are mixed together in a proportion depending upon the characteristics of the multi-olefin. The conjugated diolefins having 4 to 8 carbon atoms are preferred. With butadiene, the mixture may contain from 70 to 90 parts of isobutylene with from 30 to 10 parts of butadiene. With isoprene, the preferred range is from 95 parts to 99.5 parts of isobutylene with from 5 parts to 0.5 parts of isoprene. It may be noted that most of the multi-olefins do not copolymerize into the polymer in the proportion in which they are present in the mixture. With butadiene and isobutylene together, approximately 30% of butadiene present causes the copolymerization of only about 1% of the butadiene into the copolymer, and accordingly, there is a change in relative concentration of butadiene and isobutylene as the batch reaction proceeds. Most of the other unsaturates show different polymerization ratios, isoprene showing about as near a 1:1 ratio as any substance so far found.

A requirement of the invention lies in the addition to this polymerization reaction mixture of a compound such as divinyl benzene, which is an auxiliary copolymerization agent capable of modifying the characteristics of the polymer produced. For the purpose, the preferred agent is divinyl benzene, but such substances as the alkyl substituted divinyl benzenes or diisopropenyl benzene are equally usable. The modifying agent is added to the reaction mixture of isobutylene and diolefin in a proportion as small as 0.1% up to amounts as high as 5% on the isobutylene present, or of the total polymerizate mixture.

The reaction may be conducted batchwise; or in a continuous operation, in which continuing streams of cold unsaturate and cold catalyst with a diluent, if used, are delivered to the reactor and an overflow of a slurry or solution of polymer is taken out for the recovery of the polymer.

By the use of the continuous polymerization process the concentration of diene can be maintained at any desired value by proper control of feed rates and conversion level to produce a more homogeneous polymer.

The polymerization reaction is conducted within a range between 0° C. and −164° C.; preferably within the range between −40° C. or −50° C. and −110° C. The reduced temperature may be obtained by the direct admixture of a refrigerant-diluent such as liquid propane yielding about −40° C.; or solid carbon dioxide yielding about −78° C. or liquid ethane yielding about −88° C., or liquid ethylene yielding about −103° C. (In each instance, the actual temperatures obtained are somewhat higher because of the admixture of dissolved unsaturates.) For an "internal refrigerant" it is essential that the refrigerant be free from any tendency to copolymerize, and free from any tendency to react with the catalyst. These requirements exclude such compounds as propylene, sulfur dioxide, ammonia, and the like.

Alternatively, the reduced temperature may be obtained by a refrigerating jacket upon the reaction vessel. Any convenient refrigerant may be used in the reactor jacket including carbon dioxide, propane, especially under vacuum, ethane and ethylene, also under vacuum, or if desired, liquid methane, liquid nitrogen or liquid air, although, as a rule, these latter refrigerants yield lower temperatures than are necessary. In some instances, the fluoro chloro organic hydrocarbon compounds are also usable, depending upon the desired temperature and the particular compound available. These fluoro chloro organic compounds are, in some instances, also usable as internal refrigerants. Ethyl and methyl chloride under strong vacuum also are sometimes usable, although generally, the obtainable temperatures with these compounds are undesirably high.

The reaction may be conducted upon the mixed unsaturates as such or it may be conducted in the presence of from ½ to 10 volumes of a diluent which may be, as above pointed out, a refrigerant diluent, or may be a simple diluent, such as ethyl or methyl chloride, or methylene or ethylene dichloride or chloroform, or ethyl trichloride, or the like. In a continuous polymerization the diluent may consist of about 20 volumes per volume of reactants under equilibrium conditions in the reactor. The only requirements upon the diluent are that it shall be liquid at the reaction temperature, that it shall be non-reactive with the catalyst, and that it shall be sufficiently stable under the reaction conditions to avoid the production of breakdown products harmful to the reaction. Various of the Freons also are useful as diluents as is carbon disulfide, liquid carbon dioxide which is quite highly soluble in the reaction mixture even at low temperatures, and the like.

The catalyst is a Friedel-Crafts active metal halide catalyst substance in solution in a low-freezing, non-complex-forming solvent. Aluminum chloride is usually the preferred catalytic substance with aluminum bromide, titanium tetrachloride and zirconium chloride just about as satisfactory. Boron trifluoride in solution is satisfactorily usable with some of the diolefins. For the catalyst solvent, it is only necessary that the solvent shall have a freezing point below 0° C. although it is usually convenient to use a catalyst solvent having a freezing point below the polymerization temperature. These requirements are met by any solvent which is low-freezing, thereby having a freezing point below the freezing point of water. It is also essential that the solvent be non-complex-forming, meaning thereby that there does not separate from the solution, on evaporation of the solvent, a compound between the solvent and the Friedel-Crafts catalyst, and that upon the addition of solvent in the form of a vapor or liquid to the catalyst at constant temperatures, there shall be a substantially continuous change in the composition of the catalyst phase and a continuous increase in the partial pressure of the solvent. In general, the catalyst can be recovered unchanged by removal of the solvent. The preferred catalyst solvents with aluminum chloride are ethyl and methyl chloride or methylene or ethylene dichloride or chloroform, or occasionally, propyl chloride or carbon disulfide or sulfuryl chloride, or the like. With aluminum bromide or boron trifluoride the same solvents are advantageously usable, and, in addition, the lower-freezing hydrocarbons such as liquid propane, liquid ethane, liquid butane, liquid heptane, liquid hexane, and the like, are also usable.

After the completion of the polymerization reaction, the solid polymer is separated in a known manner from the liquid residue of the reaction mixture and brought up to room temperature. It is conveniently washed and purified on a mill to remove traces of catalyst and residual amounts of unpolymerized material, and it is then ready for compounding.

According to well-known recipes the polymers so produced may be mixed with sulfur, with vulcanization accelerators such as tetramethyl thiuram disulfide or the like, and with addition agents such as carbon black, zinc oxide, stearic acid and the like. The compounded polymers may then be cured at temperatures ranging from room temperature up to about 189° C. for time intervals ranging from hours to a few minutes, depending upon the particular compounding formula and upon the curing temperature used. The resulting cured materials have excellent tensile strengths ranging from 2500 to 4600 pounds per square inch, elongations at break ranging from 700% to 1200%, and are highly impermeable to gases, thereby being especially suited for the manufacture of inner tubes and other rubber articles.

However, the low-temperature polymerization which is used to produce the polymer, frequently proceeds at such a rapid rate that it becomes very difficult to control the molecular weight of the resulting polymer. Thus, very often polymers of undesirably high molecular weight are produced which have generally excellent properties but are extremely tough, thereby being unsuited or uneconomical for use in manufacturing operations which require mechanical working of the polymer if the modified copolymers are worked up in the usual way. This is frequently true of the copolymers which have been modified by the addition of divinyl aromatic compounds to the polymerization reactant feed.

The toughness (which is a measure of the molecular weight) of these polymers is conveniently evaluated in terms of their Mooney viscosity. The procedure for determining such viscosities is described in detail in Industrial and Engineering Chemistry, Analytical Edition, vol. 6, page 147 (1934). Polymers having Mooney viscosity values in excess of about 70 or 80 are considered unduly tough for many customary processing operations and accordingly do not meet specifications set by the government for standard GR-I rubber, under which generic name the rubbery low-temperature copolymers of isobutylene and diolefin have become known in the art.

The surprising discovery has been made that these isoolefin-diolefinic copolymers which have been modified by the addition of small quantities of divinyl aromatics to the feed, and which have undesirably high viscosities, can be effectively softened by means of surprisingly small amounts of certain aryl mercaptans, especially the monocyclic or dicyclic aryl mercaptans having 8 to 10 carbon atoms per molecule and having the mercaptan sulfur atom attached to an aromatic carbon. Useful examples of these include xylyl mercaptans, alpha-naphthyl mercaptan and beta-naphthyl mercaptan and mixtures thereof. Salts such as the zinc or calcium salts of xylyl mercaptans have also been found to be effective. Of the group mentioned, xylyl mercaptans, alpha naphthyl mercaptan and beta naphthyl mercaptan are particularly preferred. These and other aryl mercaptan compounds can be used with greatest advantage when they are added to the polymer in liquid form, e. g. in the form of a commercial solution of 33⅓% of beta naphthyl mercaptan in mineral oil (RPA #2), solutions of 36½% of xylyl mercaptan in mineral oil (RPA #3) or an oily mixture of aryl mercaptan standardized as 50% alpha naphthyl mercaptan (RPA #4).

To carry out the present invention, after the above described olefinic mixture has been polymerized to form an elastomer, warmed up to room temperature, and thoroughly freed of volatile ingredients, it is compounded with from 0.05 to 1.0 weight per cent of an aryl mercaptan softening agent and mechanically masticated at an elevated temperature ranging between 200 and 350° F., preferably between 250 and 300° F. The time required for such plasticizing treatment, especially where 0.1 to 1.0 weight per cent of aryl mercaptan is used, may range from 2 to 20 minutes, usually 5 to 15 minutes being sufficient to plasticize even a very tough polymer having a Mooney viscosity of 80 to yield a product having a Mooney viscosity of the preferred value of below 50. The presence of the aryl mercaptan thus was found to be unusually effective in reducing the power consumed by the compounding mill, causes "banding" on the rolls in a much shorter time, facilitates calendering and extrusion, and in general greatly simplifies the processing treatment and improves the workability of the copolymer. Furthermore, it was found that the addition of such plasticizers did not especially affect the other good physical properties of the polymer including the low cold flow characteristics. This is surprising and unexpected, since it would be predicted that anything tending to give a soft, more workable polymer would also increase the cold flow tendencies. Using the present invention, however, products having a Mooney viscosity value below 40 can be obtained, which at the same time, do not show undesirable cold flow properties.

The invention will be further described by the following examples of more specific embodiments, although it is not intended that the invention be so limited.

EXAMPLE I

A mixture was prepared consisting of 97.1 parts by weight of liquid isobutylene of about 98.5% purity, 2.5 parts by weight of isoprene of about 96% purity, and about 0.4% of divinyl benzene, added as a 40% solution. This mixture was cooled to a temperature of about −100° C. by the presence in the mixture of approximately 300 parts of liquid ethylene per 100 parts of mixed reactants and polymerized by the addition to the cold reactant mixture of approximately 10 parts of catalyst solution containing approximately 0.9 weight per cent of aluminum chloride dissolved in ethyl chloride. The resulting polymer was found to have a molecular weight of approximately 330,000 (a Staudinger molecular weight of about 33,800), 1.3 mole per cent unsaturation by ozonolysis and an 8′ Mooney viscosity of 45.

Other modified polymer samples were made up from feeds containing 0.2 and 0.6% of divinyl benzene. The physical properties of these divinyl benzene modified polymers were compared with properties of unmodified polymer, both for the pure gum stocks and the cured stocks. The results so obtained are shown in Tables I and II below. It can be seen that the presence of even 0.2% of divinyl benzene in the feed caused a substantial decrease in cold flow characteristics. However, the difficulties regarding extrusion rate and swell are evident in the studies reported on the divinyl benzene modified polymers. The data shows that the physical properties of the cured stock are not appreciably affected by the addition of the divinyl benzene to the polymerization feed.

*Table I*
EFFECT OF DIVINYLBENZENE CONCENTRATION ON PHYSICAL PROPERTIES OF PURE GUM

| Run No. | Percent Divinyl benzene in Feed [1] | Molecular Weight, Staudinger | Mole Percent Unsat. | Mooney Viscosity, 1½′–8′ | Pure Gum, Viscous Flow Percent/sec. @ 40° C. | Extrusion | |
|---|---|---|---|---|---|---|---|
| | | | | | | Rate, in./min. | Swell, g./in. |
| Control | 0 | 38,700 | 1.38 | 53–48 | ~0.05 | 60.0 | 2.1 |
| 1 | 0.2 | 43,000 | 1.31 | 62–54 | 0.00 | 60.1 | 2.24 |
| 2 | 0.4 | 33,800 | | 45–39 | ~0.02 | 54.3 | 2.52 |
| 3 | 0.6 | 34,000 | 1.43 | 46–45 | ~0.00 | 32.5 | 2.77 |

[1] Based on the isobutylene.

The pure gum polymer samples were compounded according to the following recipe:

| | Parts |
|---|---|
| Polymer | 100 |
| Carbon black | 50 |
| Sulfur | 2 |
| Tetramethylthiuram disulfide | 1 |
| 2-mercaptobenzothiazole | 0.5 |
| Zinc oxide | 5 |

*Table II*
PHYSICAL PROPERTIES OF CURED STOCK
[8′ tube stock cures @ 320° F.]

| Tensile | Elongation | Modulus | |
|---|---|---|---|
| | | 300% | 400% |
| 1,940 | 760 | 560 | 890 |
| 2,130 | 740 | 410 | 670 |
| 1,790 | 720 | 350 | 620 |
| 1,860 | 700 | 650 | 940 |

EXAMPLE II

A series of runs was carried out using an isobutylene-isoprene reactant feed containing 0.4% divinyl benzene. The resulting polymers were tested to study the effect of varying the Mooney viscosity on extrusion rate and extrusion swell. Table III shows that, as the Mooney viscosity value increases, the extrusion rate decreases.

*Table III*
THE EFFECT OF MOONEY VISCOSITY ON PHYSICAL PROPERTIES

| Mooney 8′ | Staudinger Mol. Wt.× 10⁻³ | Extrusion | |
|---|---|---|---|
| | | Rate, in./min. | Swell, g./in. |
| 62 | 39.2 | 48.5 | 2.26 |
| 53 | 39.2 | 48.3 | 2.25 |
| 49 | 36.0 | 49.0 | 2.40 |
| 41 | 35.2 | 50.0 | 2.44 |
| 35 | 32.6 | 53.0 | 2.40 |
| 33 | 33.0 | 52.3 | 2.32 |

EXAMPLE III

Three samples of divinyl benzene modified isobutylene-isoprene copolymer were prepared. A quantity of each of these samples were blended together with 0.3% of a solution of xylyl mercaptan in kerosene, and treated for 15 minutes at 300° F. Comparative physical properties obtained from study of the unplasticized samples, the corresponding plasticized samples, and a standard GR–I polymer are shown in Table IV. The data show the reduced Mooney values and low cold flow of the plasticized, modified polymers, as well as the greatly improved extrusion rate obtained when the modified polymers are plasticized according to this invention.

*Table IV*
XYLYL MERCAPTAN PLASTICIZATION OF DIVINYL BENZENE MODIFIED POLYMER

| Run No. | Percent Divinyl benzene | Plasticization Treatment | 8′ Mooney | Cold Flow, Percent/ Sec. | Extrusion | | |
|---|---|---|---|---|---|---|---|
| | | | | | Rate, In./Min. | Swell, g./In. | Appearance |
| 4 | 0.4 | None | 53 | 0 | 48.3 | 2.25 | Rough. |
| 5 | 0.4 | 0.3% Mercaptan | 42 | 0.007 | 56.5 | 2.30 | Smooth. |
| GR–I | None | None | 42 | 0.05 | 58.0 | 2.20 | Do. |
| 6 | 0.4 | do | 83 | 0 | 40.0 | 2.05 | Rough. |
| 7 | 0.4 | 0.3% Mercaptan | 33 | 0.03 | 52.0 | 2.20 | Smooth. |
| GR–I | None | None | 33 | 0.10 | 62.5 | 2.00 | Do. |
| 8 | 0.4 | do | 90 | 0 | 44.0 | 1.98 | Rough. |
| 9 | 0.4 | 0.3% Mercaptan | 39 | 0.02 | 51.0 | 2.06 | Smooth. |
| GR–I | None | None | 39 | 0.06 | 53.5 | 2.00 | Do. |

Table V shows physical properties of the stocks after compounding with 50 parts of carbon black per 100 parts of polymer.

Table V
PHYSICAL PROPERTIES OF PLASTICIZED, CURED STOCK

[8′ cure @ 320° F.]

| Tensile | Elongation | 300% Mod. |
|---|---|---|
| 1,910 | 800 | 440 |
| 1,840 | 820 | 340 |
| 1,980 | 800 | 330 |
| 2,420 | 730 | 640 |
| 1,530 | 690 | 450 |
| 1,620 | 695 | 460 |
| 2,020 | 650 | 710 |
| 1,830 | 750 | 620 |
| 1,870 | 770 | 630 |

What is claimed is:

1. A method of plasticizing a rubbery copolymer prepared by copolymerizing a major proportion of isobutylene with a minor proportion of a conjugated diolefin having 4 to 8 carbon atoms per molecule in the presence of from 0.1 to 5% of a divinyl aromatic hydrocarbon compound having the vinyl groups attached directly to the aromatic nucleus by a dissolved Friedel-Crafts catalyst at a temperature within the range of −40° C. to −160° C., said method comprising intimately mixing said copolymer at a temperature within the range of 200 to 350° F. with an amount ranging from 0.05 to 1.0 weight per cent of an aryl mercapto-hydrocarbon plasticizer selected from the group consisting of monocyclic and dicyclic aryl mercaptans having 8 to 10 carbon atoms per molecule and having the mercaptan sulfur atom linked to an aromatic carbon atom.

2. A method for decreasing the toughness of a copolymer prepared by copolymerizing a major proportion of isobutylene and a minor proportion of a conjugated diolefin having 4 to 8 carbon atoms per molecule in the presence of from 0.1 to 5% of divinyl benzene by a dissolved Friedel-Crafts catalyst at a temperature within the range of −40 C. to −160° C., comprising intimately admixing said copolymer at a temperature between 200 and 350° F. with 0.1 to 1.0 weight per cent of a mercapto-hydrocarbon plasticizer of the group consisting of monocyclic and dicyclic aryl mercaptans having 8 to 10 carbon atoms per molecule and having the mercaptan sulfur atom linked to an aromatic carbon.

3. The method according to claim 2 in which the conjugated diolefin is butadiene.

4. The method according to claim 2 in which the conjugated diolefin is isoprene.

5. The method according to claim 2 wherein the plasticizer is xylyl mercaptan.

6. The method of claim 2 wherein the plasticizer is beta naphthyl mercaptan.

7. The method of claim 2 wherein the plasticizer is alpha naphthyl mercaptan.

8. A method of plasticizing a rubbery copolymer prepared by copolymerizing a mixture containing 95 to 99.5 parts by weight of isobutylene, 5 to 0.5 parts by weight of isoprene, and about 0.4% of divinyl benzene in the presence of a dissolved Friedel-Crafts catalyst at a temperature of about −100° C., which comprises admixing said copolymer at a temperature of 300° F. for about fifteen minutes with about 0.3% of a solution of xylyl mercaptan dissolved in kerosene.

9. Product of the process of claim 1.

10. Product of the process of claim 2.

11. Product of the process of claim 8.

References Cited in the file of this patent

UNITED STATES PATENTS

| Number | Name | Date |
|---|---|---|
| 2,466,301 | Haworth et al. | Apr. 5, 1949 |
| 2,474,807 | Schoene | July 5, 1949 |